United States Patent
Bala et al.

(10) Patent No.: US 8,649,167 B2
(45) Date of Patent: Feb. 11, 2014

(54) PIVOTING MOUNTS FOR MEDIA DRIVES

(75) Inventors: Kapil Rao Ganta Papa Rao Bala, Houston, TX (US); Alan B Doerr, Magnolia, TX (US); Minh H Nguyen, Katy, TX (US); Kelly K Smith, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 13/320,607

(22) PCT Filed: Jun. 19, 2009

(86) PCT No.: PCT/US2009/047876
§ 371 (c)(1),
(2), (4) Date: Nov. 15, 2011

(87) PCT Pub. No.: WO2010/147591
PCT Pub. Date: Dec. 23, 2010

(65) Prior Publication Data
US 2012/0268889 A1    Oct. 25, 2012

(51) Int. Cl.
*G06F 1/16* (2006.01)
*H05K 5/00* (2006.01)
*H05K 7/00* (2006.01)

(52) U.S. Cl.
USPC ................... 361/679.33; 361/679.01

(58) Field of Classification Search
USPC ............. 361/679.01, 679.02, 679.31, 679.32, 361/679.33
See application file for complete search history.

(56) References Cited

U.S. PATENT DOCUMENTS

| | | | |
|---|---|---|---|
| 5,566,383 A * | 10/1996 | Gildea et al. | 361/679.37 |
| 2002/0085347 A1 | 7/2002 | Erickson et al. | |
| 2004/0047116 A1 | 3/2004 | Dighde et al. | |
| 2005/0068720 A1 | 3/2005 | Lambert et al. | |
| 2005/0105266 A1 | 5/2005 | Wang | |
| 2008/0062635 A1 | 3/2008 | Chang | |
| 2010/0277861 A1 * | 11/2010 | Roesner et al. | 361/679.33 |

* cited by examiner

*Primary Examiner* — Bernard Rojas

(57) ABSTRACT

Apparatus (100) is provided for mounting media drives. Top and bottom frames (102, 104) are coupled together in a pivoting relationship (106, 108). The frames (102, 104) are configured to receive top and bottom media drives, respectively. In a closed position, the top frame (102) fits substantially over the bottom frame (104). In an open position, the top frame (102) pivots away from the bottom frame (104) by a pivot angle (136) sufficient to insert the bottom media drive into or remove the bottom media drive from the bottom tray (104).

20 Claims, 13 Drawing Sheets

PIVOTING MOUNTS FOR MEDIA DRIVES

CROSS REFERENCE TO RELATED APPLICATIONS

The present application claims priority from PCT/US2009/047876 filed on Jun. 19, 2009 by Kapil Rao Ganta Papa Rao Bala et al. and entitled PIVOTING MOUNTS FOR MEDIA DRIVES.

FIELD OF THE INVENTION

This invention relates generally to mounting techniques for media drives.

BACKGROUND

The term "media drive" as used herein shall mean any assembly that contains at least one computer-readable storage medium. Examples include, without limitation, hard disk drives, optical disk drives and the like.

It is known to mount one or more media drives within the enclosure of a computing device. For example, media drives may be mounted within the enclosures of desktop computers, server racks or mobile computers.

DETAILED DESCRIPTION OF THE PREFERRED EMBODIMENTS

Figure 1:
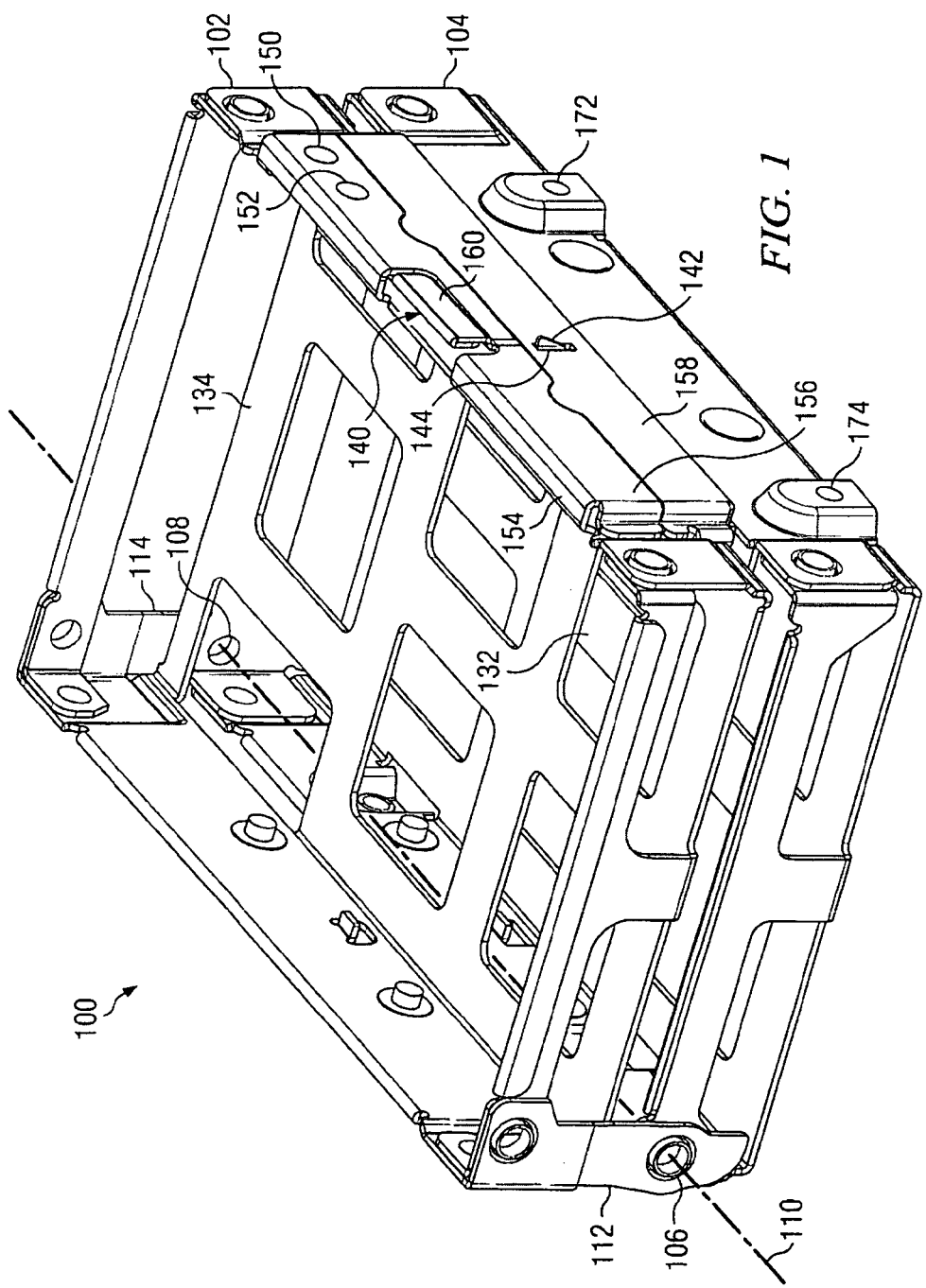
FIG. 1 is an isometric view of two pivoting media drive mounting frames according to a preferred embodiment of the invention, wherein the frames are shown in a closed position.

An apparatus 100 for mounting media drives will now be described. Apparatus 100 includes a top media drive mounting frame 102 and a bottom media drive mounting frame 104. Top and bottom frames 102, 104 are pivotingly coupled to one another. In the embodiment shown, this is accomplished by fastening the frames together at pivot points 106, 108 such that a pivot axis 110 is established along one side of frames 102, 104. In other embodiments, other means such as hinges may be used to pivotingly couple frames 102, 104 to one another. In the illustrated embodiment, pivot arms 112, 114 extend from top frame 102. Each of pivot arms 112, 114 defines a hole 116, 118 for engagement during assembly with extruded cylinders 120, 122 disposed on bottom frame 104 at pivot points 106, 108. After engagement, the ends of the extruded cylinders may be swaged outward to retain pivot arms 112, 114 in place, completing assembly. Greater or lesser damping of movement may be provided by making the fit tighter or looser at pivot points 106, 108. Frames 102, 104 may be constructed using any suitably rigid material. In one embodiment, cold rolled steel was used.

FIG. 1 shows frames 102, 104 in a closed position in which top frame 102 fits substantially over bottom frame 104. To aid in the alignment of the two frames when in this position, protrusions such as protrusions 124, 126 may be provided in one or both of the frames (top and/or bottom) for engagement with corresponding recesses 128, 130 in the other frame (bottom and/or top). In the closed position, the top and bottom frames are aligned with one another in an over-and-under relationship, and planes defined by bottoms 132, 134 of the frames are substantially parallel with one another.

Figure 2:
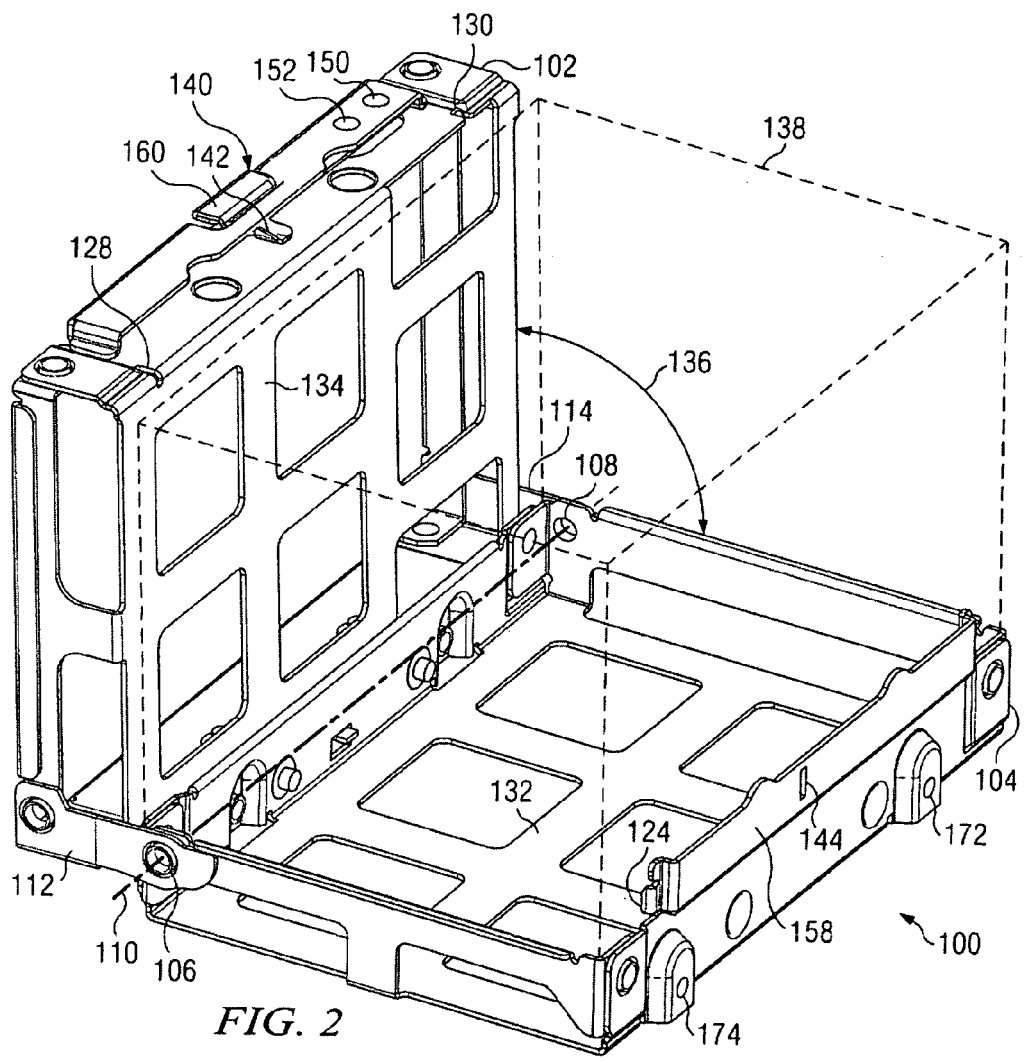
FIG. 2 is an isometric view of the mounting frames of FIG. 1, wherein the frames are shown in an open position.

FIG. 2 shows frames 102, 104 in an open position in which top frame 102 has pivoted away from bottom frame 104 along a pivot angle 136. In the closed position, pivot angle 136 is approximately zero degrees. In the open position, pivot angle 136 can be at least ninety degrees in a preferred embodiment so that top frame 102 entirely clears a volume 138 extending orthogonally upward from the perimeter of bottom frame 104 as shown in FIG. 2. This position facilitates easy insertion of a media drive into, or removal of a media drive from, bottom frame 104. In other embodiments, pivot angle 136 may be less than ninety degrees in the open position, provided the angle is large enough to enable access to contents contained in bottom frame 104.

Figure 6:
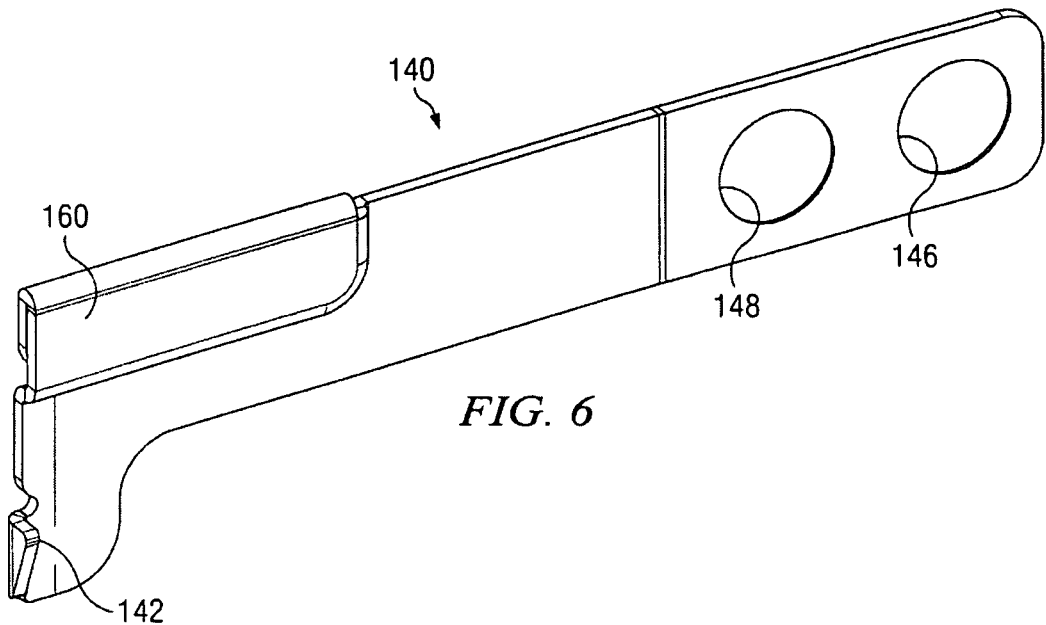
FIG. 6 is an isometric view of a latch suitable for attachment to the top frame of FIG. 1 according to a preferred embodiment of the invention.

In further embodiments, a latch 140 may be included to help hold top frame 102 to bottom frame 104 when apparatus 100 is in the closed position. FIG. 6 illustrates one possible embodiment of latch 140 in more detail. Latch 140 defines a catch 142 for engagement with a latching surface 144 defined in bottom frame 104. In the embodiment shown, latch 140 is anchored to top frame 102. In alternative embodiments, latch 140 may be anchored to bottom frame 104 and the latching surface formed in top frame 102.

Preferably, some means is provided for biasing the latch so that catch 142 engages with latching surface 144 automatically when top frame 102 is pivoted down from the open to the closed position. One way to accomplish this is to form latch 140 from a resilient material such as stainless steel so that the bias is provided by the latch itself. Specifically, the latch may be staked to top frame 102 by fitting holes 146, 148 over corresponding cylinders 150, 152 formed in an outer side 156 of a bulkhead 154 on frame 102. Cylinders 150, 152 may then be swaged over to retain latch 140 against outer side 156 of bulkhead 154. Preferably, outer side 156 of bulkhead 154 is aligned with a corresponding surface 158 of bottom frame 104 in which latching surface 144 is defined, to facilitate the automatic engagement of catch 142 with latching surface 144. To disengage latch 140 from bottom frame 104, manual force may be applied to touch point 160, urging latch 140 inside bulkhead 154 away from outer side 156 until catch 142 clears latching surface 144.

In the embodiment shown, latch 140 is disposed on the side of apparatus 100 opposite that of pivot axis 110. In alternative embodiments, latch 140 may be placed in other positions, such as on one or both of the other two sides (ends) of frames 102, 104. Moreover, pivot axis 110 may be located on any of the four sides of frames 102, 104.

Figure 10:
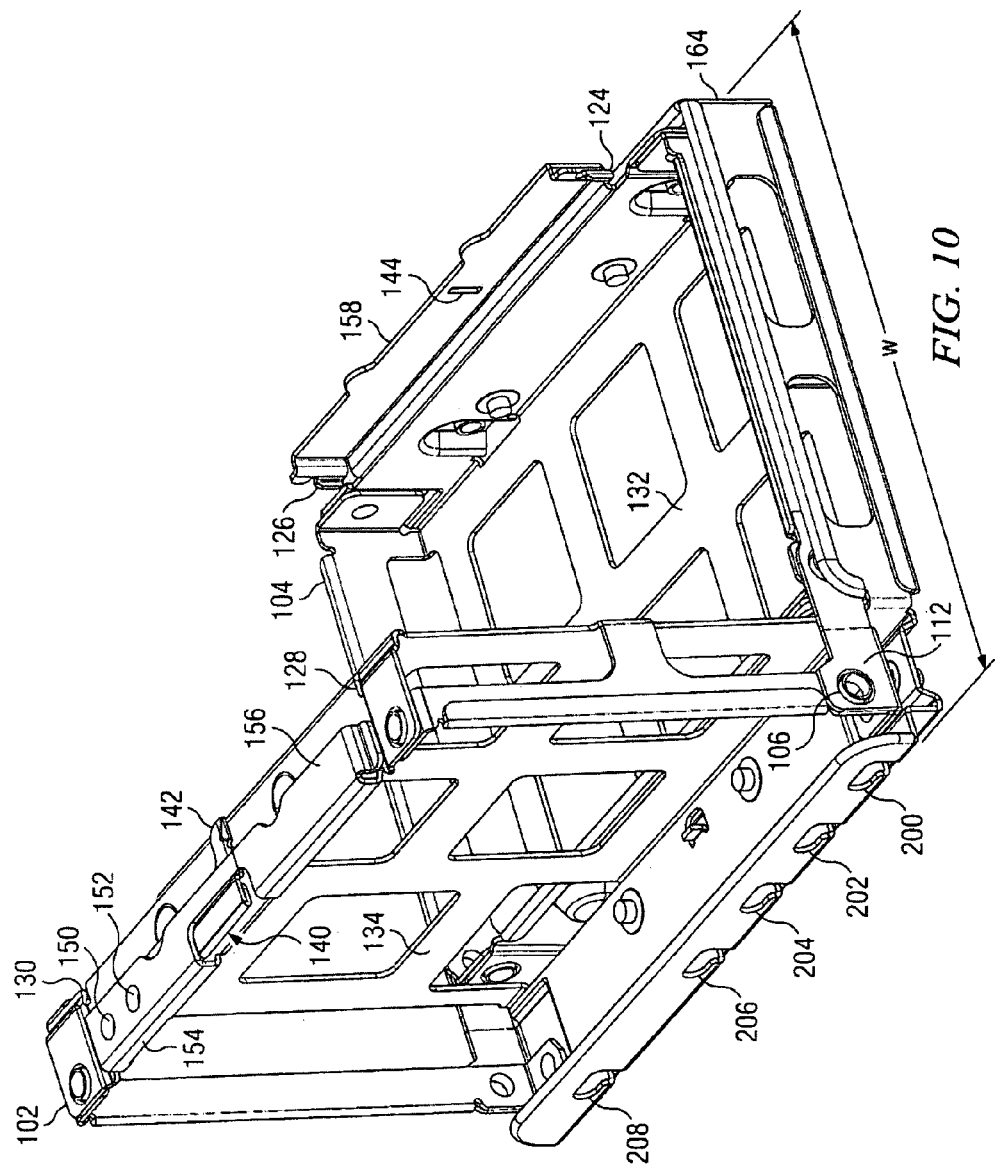
FIG. 10 is an isometric view from the viewpoint of FIG. 9, wherein the frames are shown in the open position.
Figure 11:
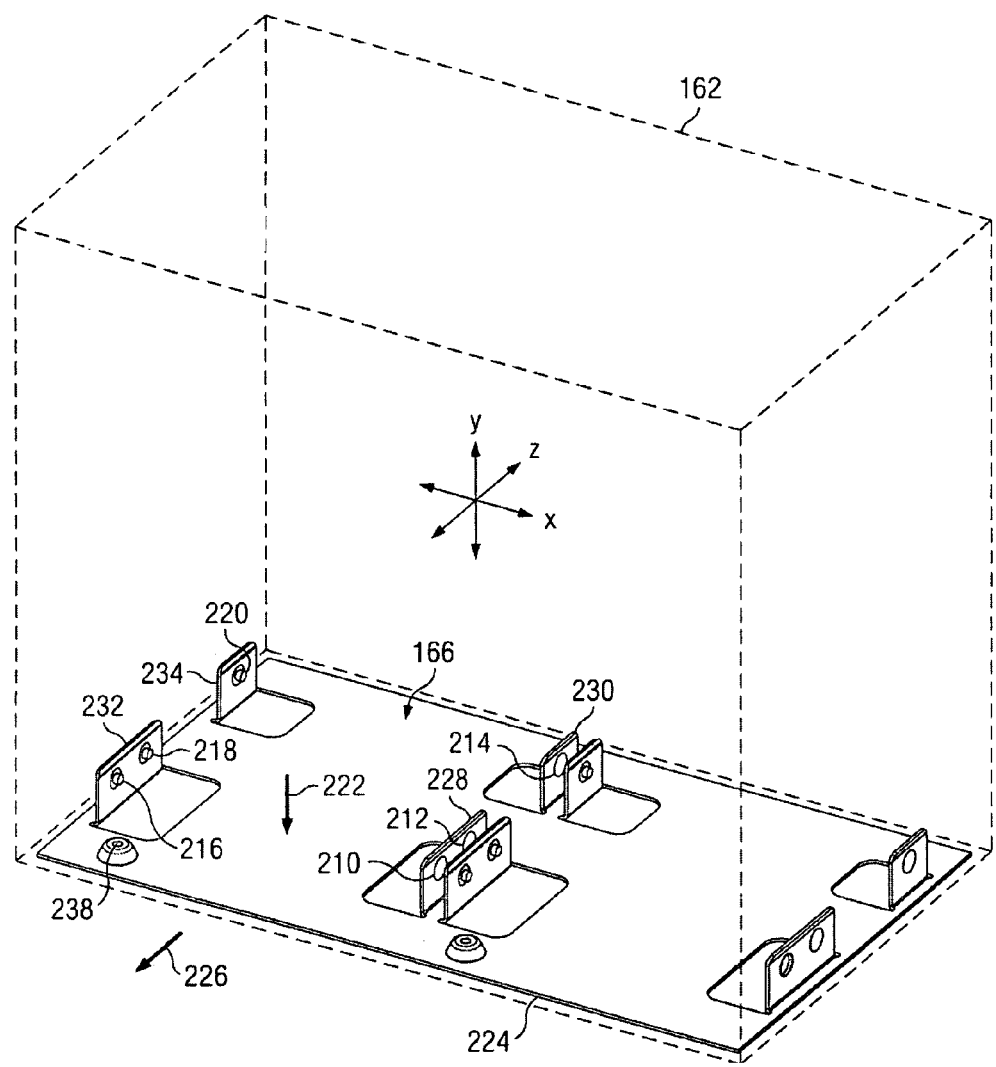
FIG. 11 is an isometric view illustrating a support structure in an enclosure, adapted to receive the bracket of FIG. 7 according to one of numerous possible embodiments of the invention.
Figure 12:
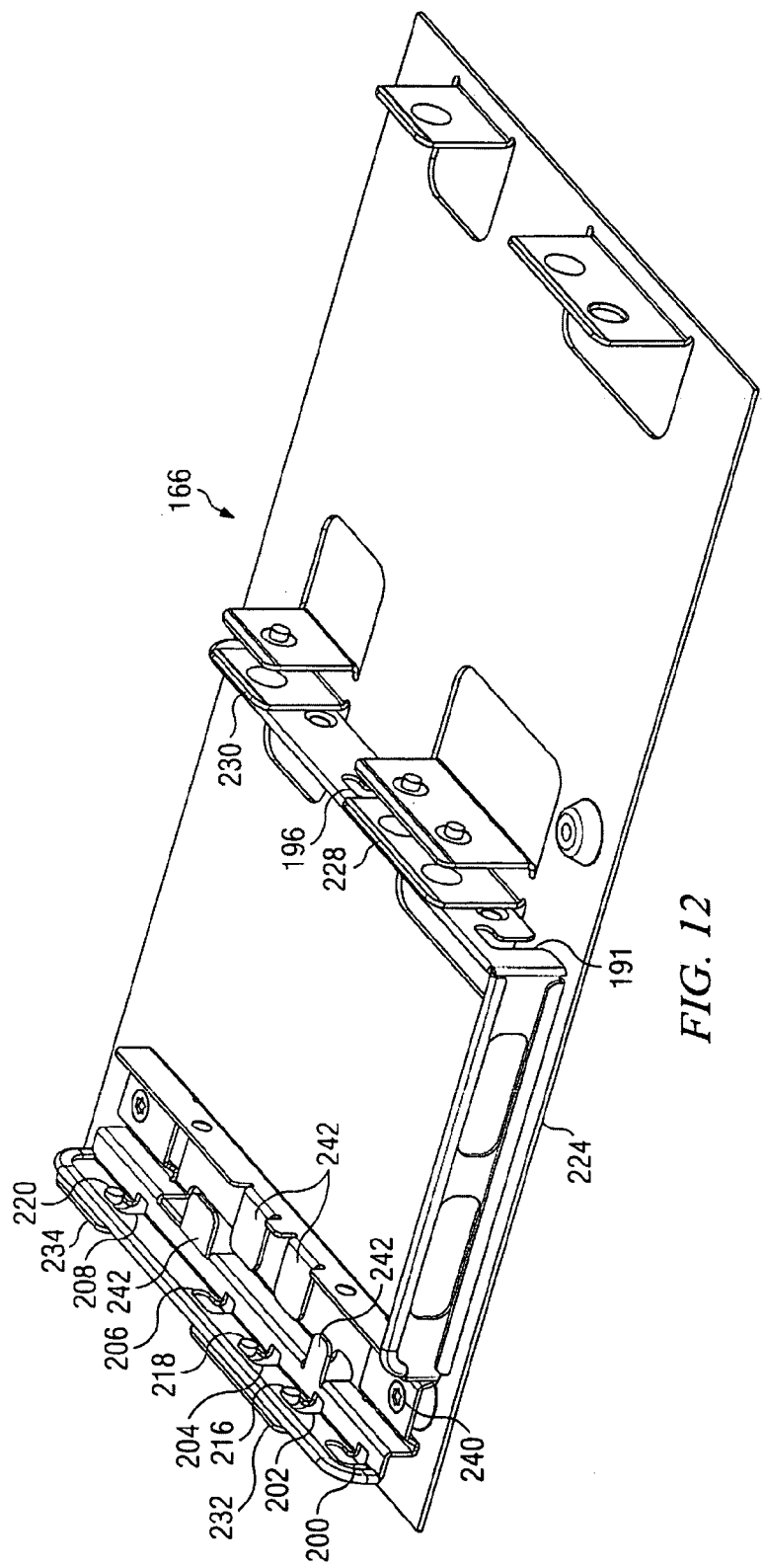
FIG. 12 is an isometric view of the support structure of FIG. 11, shown with the bracket of FIG. 7 attached thereto in one of several possible positions.
Figure 13:
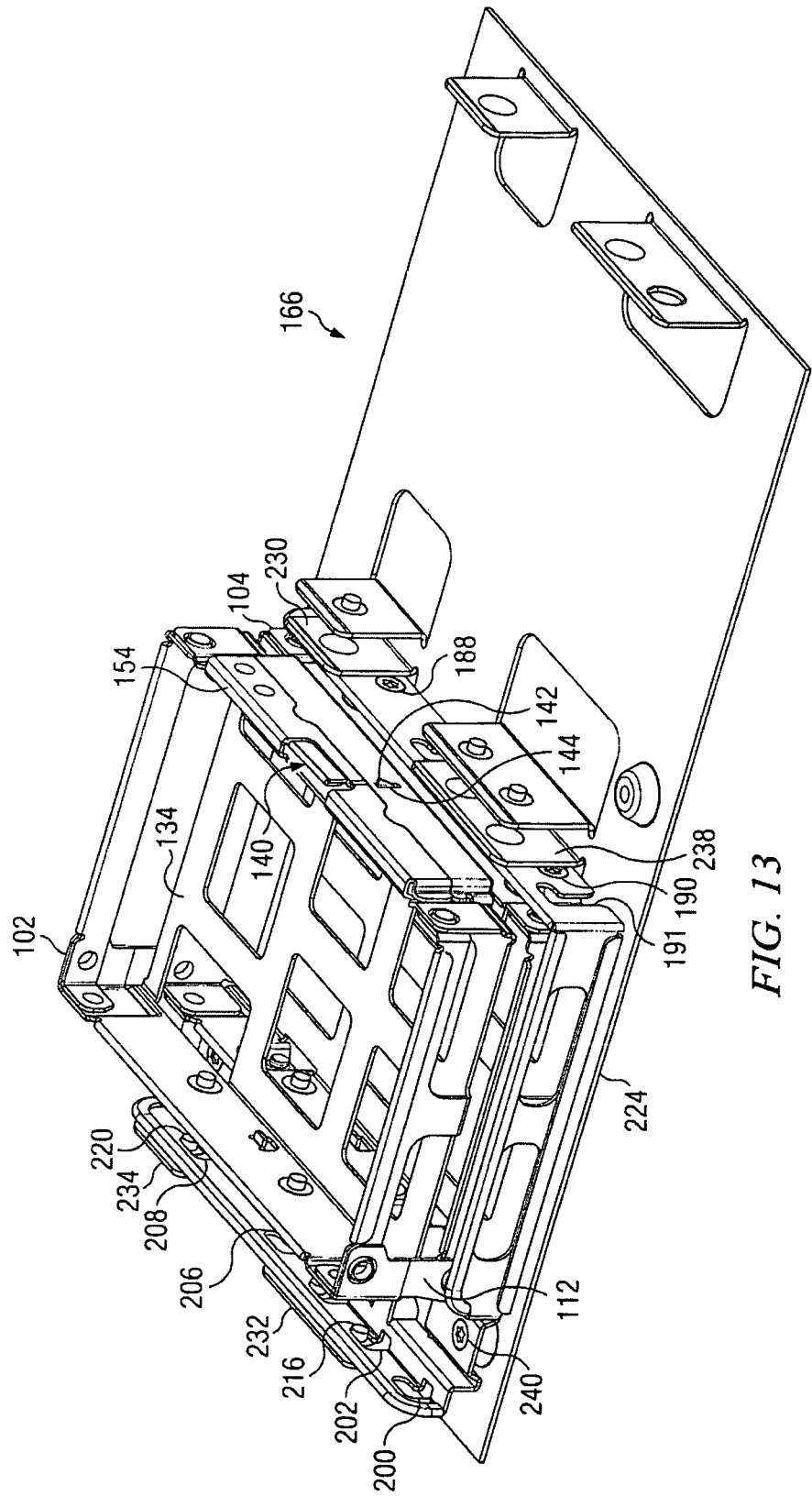
FIG. 13 is an isometric view similar to FIG. 12, wherein the bracket is shown with the frames of FIG. 1 attached thereto.

In many applications, apparatus 100 may be housed within the enclosure 162 of an electronic device such as a computing device (see FIG. 11). The latter may be any kind of computing device including, for example and without limitation, a mobile computer, a desktop computer or a server rack. A variety of techniques may be used to mount apparatus 100 inside such an enclosure. A preferred class of techniques for doing so will now be described with reference to FIGS. 7-13.

Figure 8:
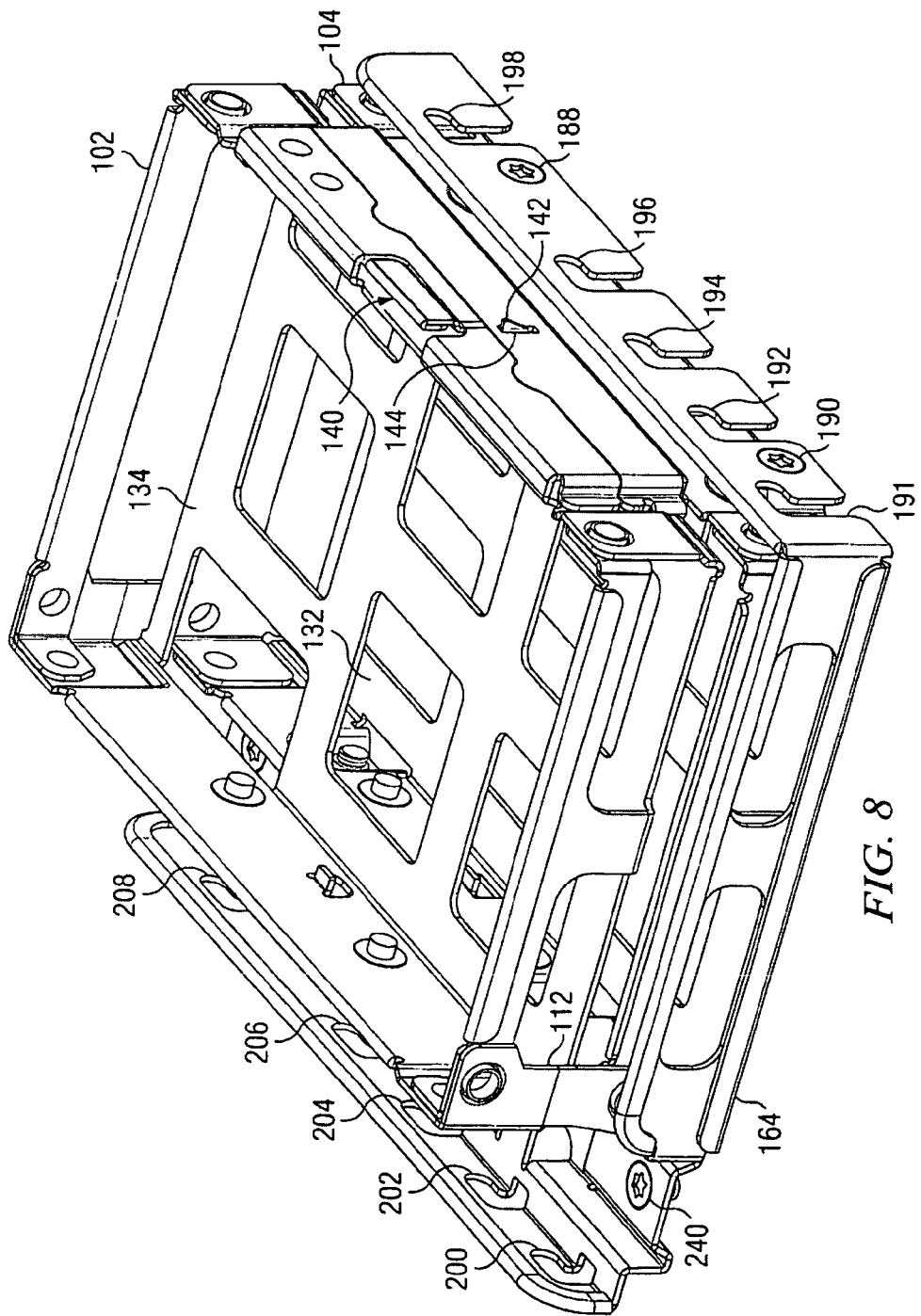
FIGS. 8 and 9 are isometric views showing the frames of FIG. 1 attached to the bracket of FIG. 7 according to a preferred embodiment of the invention, wherein the frames are shown in the closed position.
Figure 9:
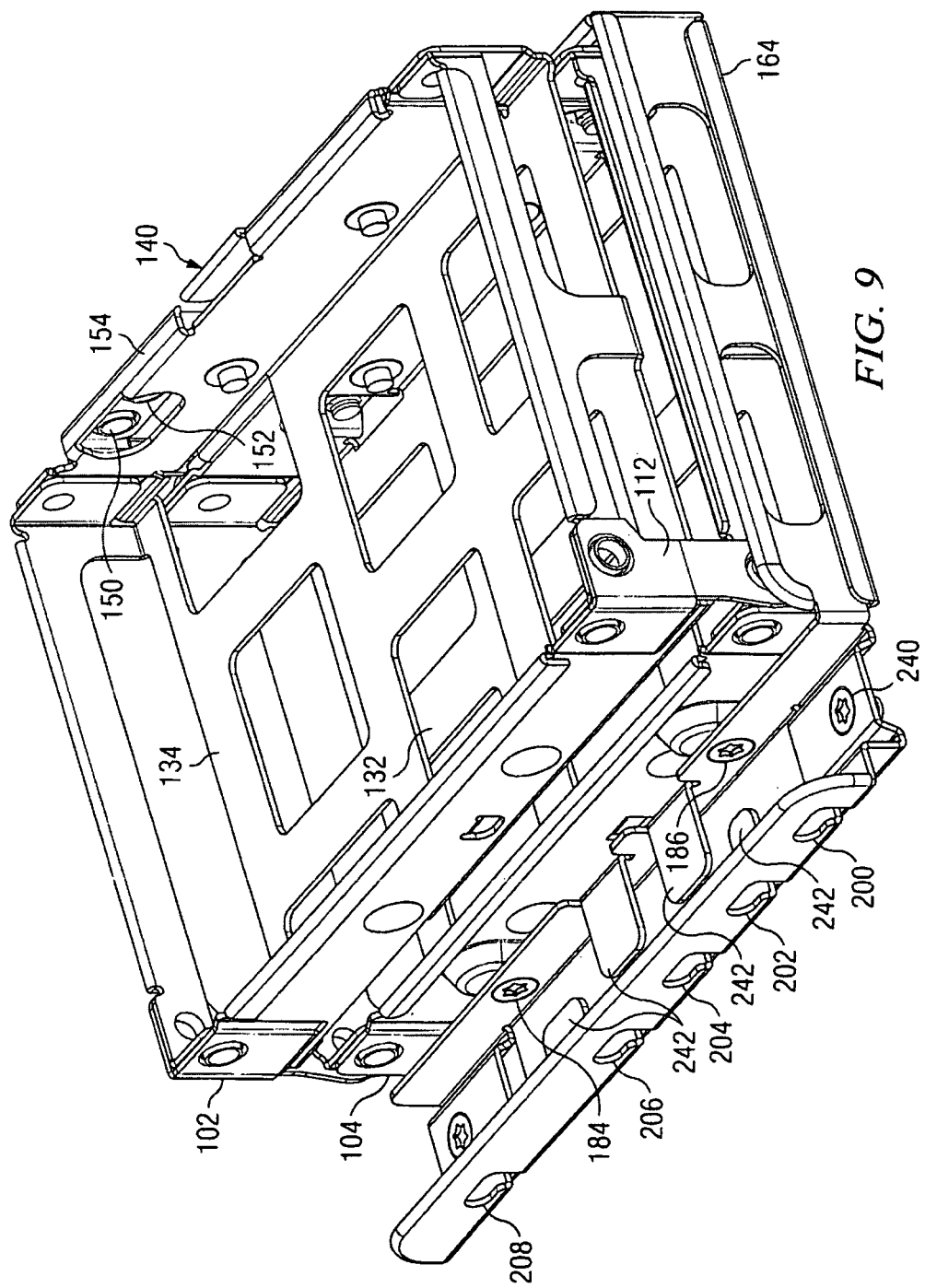

A bracket 164 (see FIG. 7) may be configured to receive bottom tray 104 and to be mounted to a support structure 166 within enclosure 162. Support structure 166 may take a variety of forms. For example, it may take the form of a tray that is configured to be mounted within enclosure 162, or it may comprise a portion of a chassis wall (bottom, top or any side) of enclosure 162. As shown in FIGS. 8 and 9, mounting points 168-174 on bottom frame 104 may be secured to bracket 164 at corresponding mounting points 176-182 on bracket 164. Any suitable fastener may be used for this purpose, such as screws 184-190.

Bracket 164 defines a plurality of right-angle slots 191-208. Support structure 166 includes a plurality of spools 210-220. In alternative embodiments, the slots may be defined in the support structure and the spools included on the bracket. To secure bracket 164 onto support structure 166, bracket 164 may be moved in direction 222 (see FIG. 11) orthogonally toward a plane of support structure 166 defined by floor 224, until the vertical portions of the right-angle slots pass over the spools. Then, bracket 164 may be translated in direction 226 parallel with the plane defined by floor 224 until the spools reach the ends of the right-angle slots (see FIG. 12 wherein bracket 164 is shown without apparatus 100, for clarity). Once bracket 164 has reached this position, any further movement is constrained in the x axis by spool supports 228-234 and in the y axis by the slots themselves.

A hole 236 may be provided in bracket 164, and a corresponding hole 238 provided in floor 224 of support structure 166. At the completion of assembly as described above, holes 236 and 238 are aligned for receiving a fastener to prevent further translation of bracket 164 in the z direction. Any suitable fastener may be used for this purpose, such as a screw or a resilient, clip.

In the illustrated installation, only slots 192, 194, 198, 202, 204 and 208 are used. In another installation, slots 191, 192, 196, 200, 202 and 206 may be used instead, so that bracket 164 is positioned further along the z direction. (Another hole like hole 238 may be provided in support structure 166 to secure the bracket in this alternative installation position.) As long as either the spools or the slots are sufficiently numerous in the bracket and support structure, a variety of similar installation positions may be provided.

In further embodiments, one or more stops 242 may be provided on bracket 164. Stops 242 act to support top frame 102 when apparatus 100 is in the open position, as illustrated in FIG. 10, preventing top frame 102 from pivoting too far beyond ninety degrees from its closed position.

In one class of preferred embodiments, bracket 164 defines a width "w" (see FIG. 7) orthogonal to pivot axis 110. Width "w" is large enough that both top frame 102 and bottom frame 104 remain within width "w" in both their closed position (FIGS. 8, 9, 13) and their open position (FIG. 10). This helps to prevent interference with other components within enclosure 162 should the media drives in apparatus 100 need to be accessed after apparatus 100 has been installed into enclosure 162.

Figure 3:
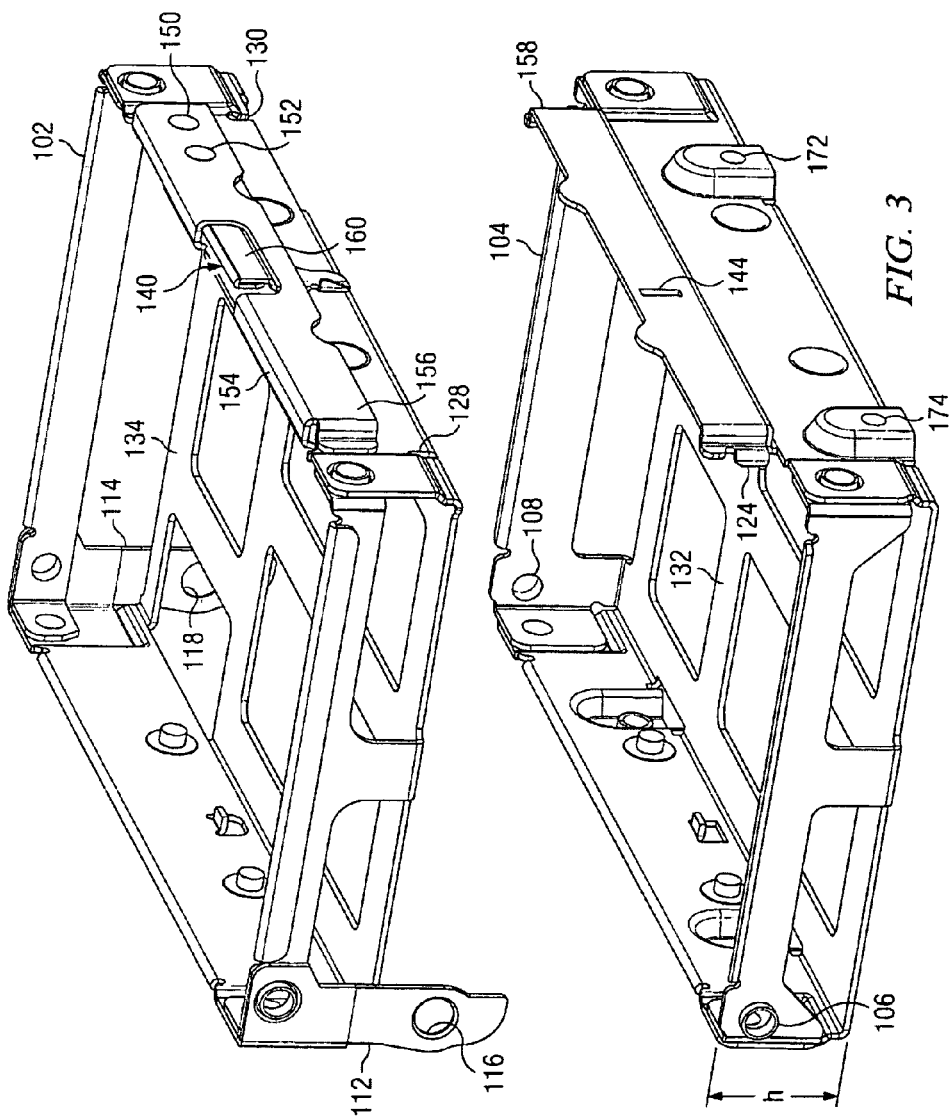
FIG. 3 is an exploded isometric assembly view of the frames of FIG. 1.
Figure 4:
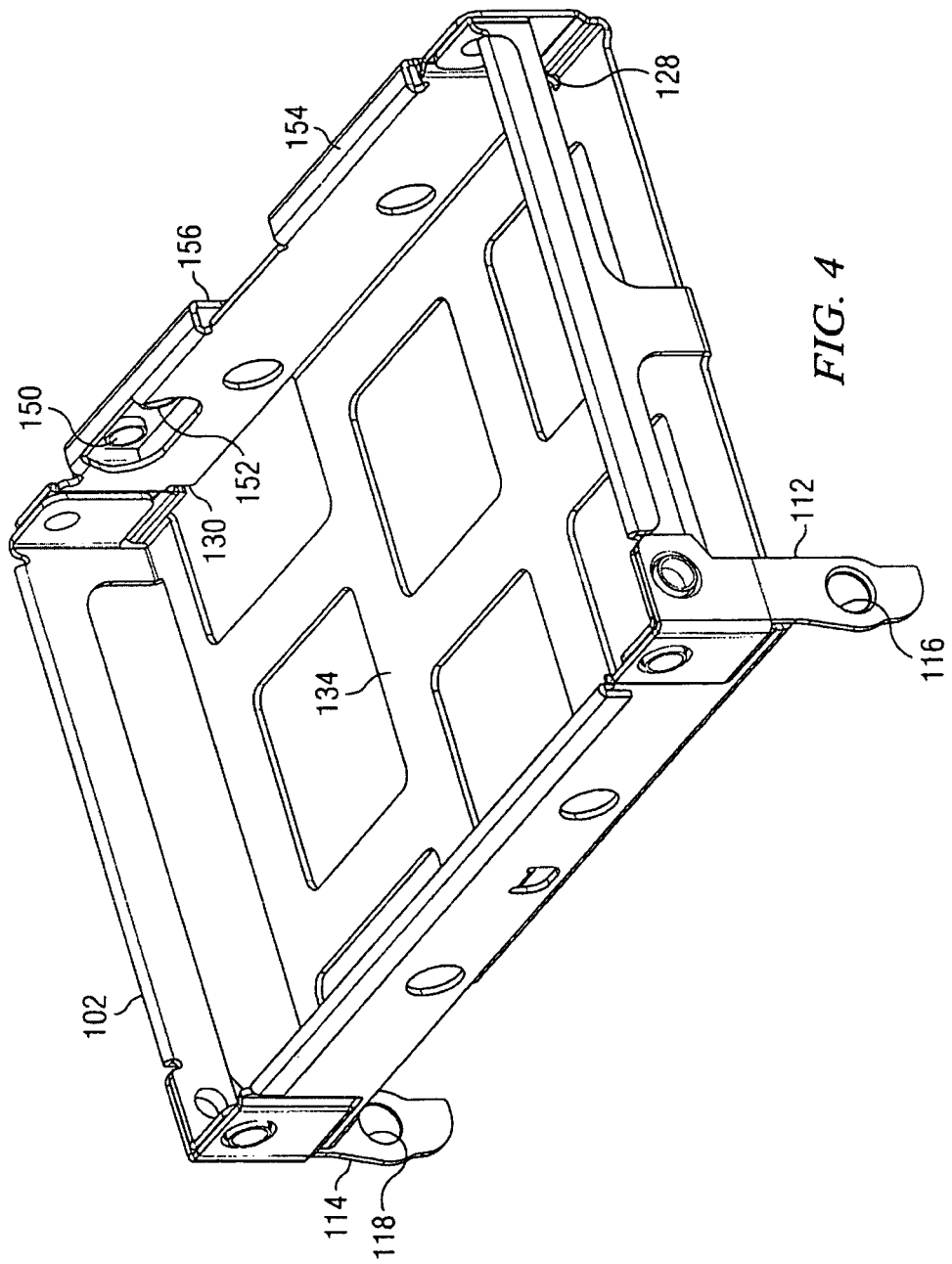
FIG. 4 is a rotated isometric view of the top frame of FIG. 1.
Figure 5:
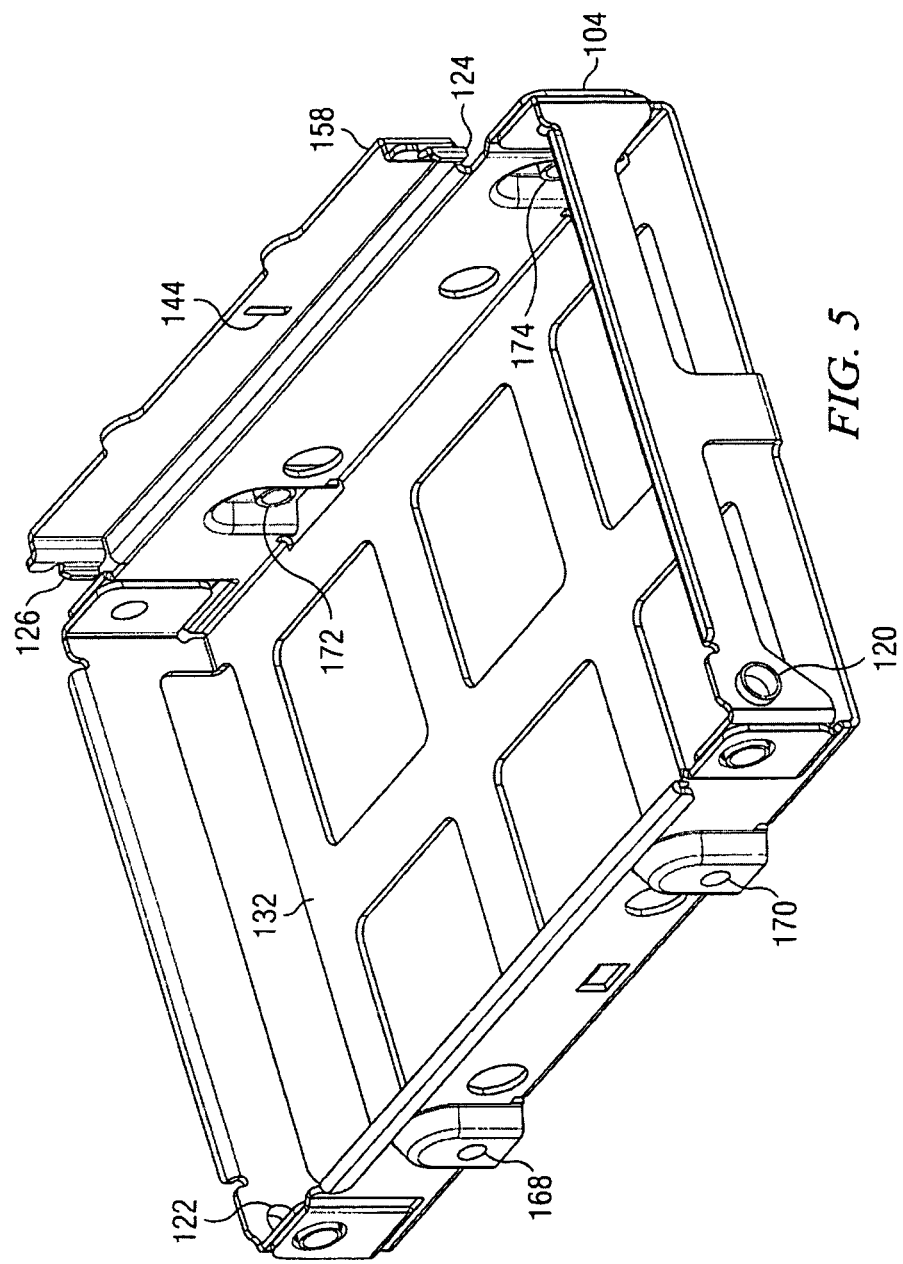
FIG. 5 is a rotated isometric view of the bottom frame of FIG. 1.
Figure 14:
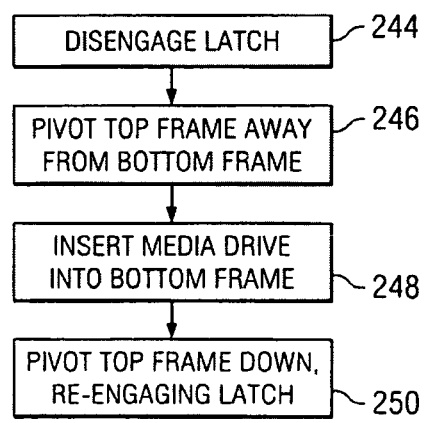
FIG. 14 is a flow diagram illustrating a method for installing a media drive in a host enclosure according to a preferred embodiment of the invention.
Figure 7:
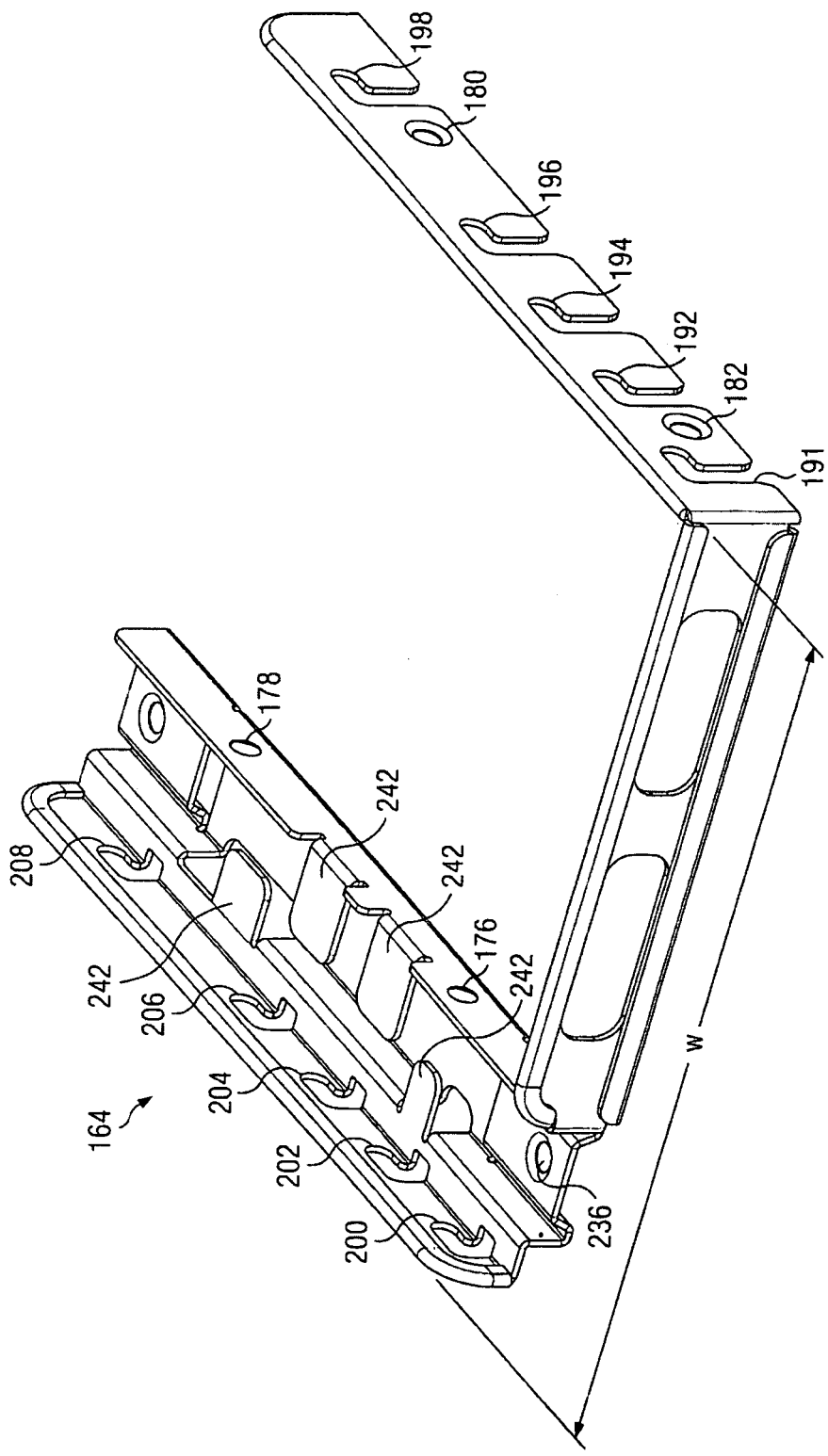
FIG. 7 is an isometric view of a bracket suitable for adapting the frames of FIG. 1 to a support structure according to a preferred embodiment of the invention.

FIG. 14 illustrates a preferred method for installing media drives in a host Structure such as enclosure 162 using apparatus 100. In step 244, latch 140 is disengaged. In step 246, top frame 102 may be pivoted away from bottom frame 104. In step 248, a bottom media drive may be inserted into bottom frame 104. Finally in step 250, top frame 102 may be pivoted down again such that latch 140 once again engages latching surface 144, securing top frame 102 to bottom frame 104. A top media drive may be inserted into top frame 102 before or after the bottom media drive has been inserted into bottom frame 104. Any suitable means may be employed to secure the media drives into the frames. Preferably the height of the bottom media drive (its y axis dimension) should not exceed the height "h" (see FIG. 3) of bottom frame 104, so that the media drive will not interfere with top frame 102 or the top media drive when apparatus 100 is closed.

The media drives that can be installed into apparatus 100 may be of any kind and can have any size or form factor. In one preferred class of embodiments, the media drives corresponded to a 2.5" form factor, and bracket 164 corresponded to a 3.5" form factor.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. An apparatus for mounting media drives, comprising:
   top and bottom frames coupled together in a pivoting relationship, the frames configured to receive top and bottom media drives, respectively, the bottom frame comprising a floor and four perimeter sidewalls projecting up from the floor that form an opening above the floor through which the bottom media drive is insertable into the bottom frame;
   wherein in a closed position, the top frame fits substantially over the floor of the bottom frame and across the opening to close the opening; and
   in an open position, the top frame pivots away from the bottom frame by a pivot angle sufficient to insert the bottom media drive into or remove the bottom media drive from the bottom frame through the opening.

2. The apparatus of claim 1, wherein:
   in the open position, the pivot angle is at least ninety degrees away from the floor and the top frame entirely clears a volume extending orthogonally upward from a perimeter of the bottom frame and orthogonally upward from the floor.

3. The apparatus of claim 1, further comprising:
   a latch configured to hold the top and bottom frames in the closed position.

4. The apparatus of claim 3, wherein:
   the pivoting relationship comprises a pivot axis disposed on a first side of the frames; and
   the latch is disposed on a second side of the frames opposite the first side.

5. The apparatus of claim 3, wherein:
the latch is anchored to the top frame defines a catch for engagement with a latching surface of the bottom frame, is resilient, and is biased such that the catch engages with the latching surface when the top frame is pivoted down from the open to the closed position.

6. The apparatus of claim 1, further comprising:
a bracket configured to receive the bottom frame, and further configured to be mounted to a support structure in an enclosure.

7. The apparatus of claim 6, wherein:
the enclosure is an enclosure of a computing device.

8. The apparatus of claim 6, wherein:
the support structure comprises a tray that is configured to be mounted within the enclosure.

9. The apparatus of claim 6, wherein:
the support structure comprises a portion of a chassis wall of the enclosure.

10. The apparatus of claim 6, wherein:
the pivoting relationship comprises a pivot axis;
the bracket defines a width along an axis orthogonal to the pivot axis; and
the width (w) is sufficiently large that the top and bottom frames remain within the width (w) in both the closed and the open positions.

11. The apparatus of claim 6, wherein:
the support structure and the bracket define a plurality of right-angle slots and a corresponding plurality of spools for engagement with the right-angle slots, configured such that the bracket may be moved orthogonally toward a plane of the support structure and then translated parallel with the plane to secure the bracket to the support structure in two axes (x, y).

12. The apparatus of claim 11, further comprising:
holes in the support structure and bracket, aligned for receiving a fastener to prevent further translation of the bracket relative to the support structure once the bracket has been secured to the support structure.

13. The apparatus of claim 11, wherein:
either the right-angle slots or the spools are sufficiently numerous that the bracket may be secured to the support structure in more than one position relative to the support structure.

14. A method of installing a media drive in a host structure, comprising:
disengaging a latch that secures a top media drive mounting frame to a bottom media drive mounting frame, the bottom media drive mounting frame having an opening through which a media drive is insertable into the bottom frame, wherein the top frame forms a selectively openable and closable cover lid for the opening of the bottom frame; the top frame pivotingly coupled to the bottom frame;
pivoting the top frame away from the bottom frame;
inserting the media drive into the bottom frame through the opening; and
pivoting the top frame down again such that the latch engages once again to secure the top frame to the bottom frame with the cover lid of the top frame fitting substantially across the opening to close the opening.

15. The apparatus of claim 1 further comprising:
an enclosure to receive a computing device, wherein the top and bottom media drive mounting frames are disposed within the enclosure and wherein, in an open position, the top frame pivots away from the bottom frame to enable access to contents of the bottom frame.

16. An apparatus for mounting media drives, comprising:
top and bottom frames coupled together in a pivoting relationship, the frames configured to receive top and bottom media drives, respectively;
wherein in a closed position, the top frame fits substantially over the bottom frame; and
in an open position, the top frame pivots away from the bottom frame by a pivot angle sufficient to insert the bottom media drive into or remove the bottom media drive from the bottom frame;
a latch configured to hold the top and bottom frames in the closed position, wherein the latch is anchored to the top frame defines a catch for engagement with a latching surface of the bottom frame, is resilient, and is biased such that the catch engages with the latching surface when the top frame is pivoted down from the open to the closed position.

17. An apparatus for mounting media drives, comprising:
top and bottom frames coupled together in a pivoting relationship, the frames configured to receive top and bottom media drives, respectively;
wherein in a closed position, the top frame fits substantially over the bottom frame; and
in an open position, the top frame pivots away from the bottom frame by a pivot angle sufficient to insert the bottom media drive into or remove the bottom media drive from the bottom frame;
a bracket configured to receive the bottom frame, and further configured to be mounted to a support structure in an enclosure;
the pivoting relationship comprises a pivot axis;
the bracket defines a width (w) along an axis orthogonal to the pivot axis; and
the width (w) is sufficiently large that the top and bottom frames remain within the width (w) in both the closed and the open positions.

18. An apparatus for mounting media drives, comprising:
top and bottom frames coupled together in a pivoting relationship, the frames configured to receive top and bottom media drives, respectively;
wherein in a closed position, the top frame fits substantially over the bottom frame; and
in an open position, the top frame pivots away from the bottom frame by a pivot angle sufficient to insert the bottom media drive into or remove the bottom media drive from the bottom frame;
a bracket configured to receive the bottom frame, and further configured to be mounted to a support structure in an enclosure, wherein the support structure and the bracket define a plurality of right-angle slots and a corresponding plurality of spools for engagement with the right-angle slots, configured such that the bracket may be moved orthogonally toward a plane of the support structure and then translated parallel with the plane to secure the bracket to the support structure in two axes (x, y).

19. The apparatus of claim 18, further comprising:
holes in the support structure and bracket, aligned for receiving a fastener to prevent further translation of the bracket relative to the support structure once the bracket has been secured to the support structure.

20. The apparatus of claim 18, wherein:
either the right-angle slots or the spools are sufficiently numerous that the bracket may be secured to the support structure in more than one position relative to the support structure.

* * * * *

UNITED STATES PATENT AND TRADEMARK OFFICE
CERTIFICATE OF CORRECTION

PATENT NO. : 8,649,167 B2  
APPLICATION NO. : 13/320607  
DATED : February 11, 2014  
INVENTOR(S) : Kapil Rao Ganta Papa Rao Bala et al.

It is certified that error appears in the above-identified patent and that said Letters Patent is hereby corrected as shown below:

In the Claims

In column 5, line 21, in Claim 10, delete "width" and insert -- width (w) --, therefor.

Signed and Sealed this
Twenty-fifth Day of November, 2014

Michelle K. Lee
*Deputy Director of the United States Patent and Trademark Office*